UNITED STATES PATENT OFFICE.

CHARLES GERBER, OF PARIS, FRANCE, ASSIGNOR TO JACQUES BIENENFELD, OF PARIS, FRANCE.

PAINT PASTE.

1,405,109.  Specification of Letters Patent.  Patented Jan. 31, 1922.

No Drawing.   Application filed August 25, 1919.  Serial No. 319,653.

*To all whom it may concern:*

Be it known that I, CHARLES GERBER, citizen of the Republic of France, residing at Paris, France, have invented new and useful Improvements in Paint Paste, of which the following is a specification.

The invention relates to a white paint by the use of which colors of all tints can be produced.

Oil, essence and varnish paints are now to be found in the trade, but are expensive and health injurious on account of their zinc or lead content. On the other hand, size colors are known which are cheap but are neither washable nor durable.

The purpose of this invention is to provide a novel product whereby the aforesaid drawbacks are avoided, i. e., to produce a novel paint which is cheap and not liable to injure the health of the workman while possessing all the properties of the expensive paints known up to present time. In other words, this paint may be washed, brushed and used in-doors as well as out-of-doors.

The process for making this product is as follows:

Wax is dissolved under heating in a suitable essence, preferably in spirits of turpentine and a solution of soap in hot water is added thereto. A solution of glue in hot water is then added to the mixture, after which linseed oil is poured into the hot liquid compound obtained.

To this mixture is then added albumin warmed by means of hot water.

The mixture is thoroughly stirred and finally metallic or mineral whiting is added thereto, the choice between the kind of whiting to be used depending upon the special properties required. By using mineral whiting (comprising ground chalk free from impurities) in combination with the hereinafter specified materials, the paint obtained will be cheap, hygienic, and firm. If the paint desired must have more consistency, whiting (such as a mixture of zinc sulphide with barium sulphide) may be substituted partly or wholly for the mineral whiting but the paint will lose its hygienic qualities and will be more expensive.

The quantities of materials to be used for producing 100 pounds of paint are the following:

| | Pounds. |
|---|---|
| Soap | 2 |
| Glue | 1⅔ |
| Spirits of turpentine | 4 |
| Wax | 1⅔ |
| Linseed oil | 4 |
| Albumin | 3⅓ |
| Water | 33⅓ |
| Whiting | 50 |
| | 100 |

The above proportions have been found to give a perfect product. By varying them slightly a paint will be obtained which will not have exactly the same advantages.

It will be understood that the invention consists in compounding together the above materials in suitable proportions, those indicated having been found to give very good results.

What I claim is:—

1. A paint paste comprising a mixture of soap, glue, spirits of turpentine, wax, linseed oil, albumin, water and whiting, substantially in the proportion of two parts of soap, one and two-thirds parts glue, four parts spirits of turpentine, one and two-thirds parts wax, four parts linseed oil, three and one-third parts albumin, thirty-three and one-third parts water, and fifty parts whiting, by weight.

2. White paint in paste form which is to serve as a basis of paints of all tints, comprising soft soap of potassium, wax, linseed oil, dissolved in warm water and whiting, these products then being combined by means of essence of turpentine, rabbit glue and blood albumin.

In testimony whereof I have signed my name to this specification in the presence of the subscribing witness.

CHARLES GERBER.

Witness:
CHAS. P. PRESSLY.